(12) United States Patent
Ueki et al.

(10) Patent No.: US 9,660,240 B2
(45) Date of Patent: May 23, 2017

(54) SECONDARY BATTERY INCLUDING SEPARATOR CONTAINING ELECTROCONDUCTIVE POROUS LAYER SANDWICHED BETWEEN ELECTROCONDUCTIVE MATERIAL-FREE POROUS LAYERS

(75) Inventors: Tomoyoshi Ueki, Toyota (JP);
Harunari Shimamura, Moriguchi (JP);
Yusuke Fukumoto, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 203 days.

(21) Appl. No.: 14/130,993

(22) PCT Filed: Jul. 7, 2011

(86) PCT No.: PCT/JP2011/065609
§ 371 (c)(1),
(2), (4) Date: Jan. 6, 2014

(87) PCT Pub. No.: WO2013/005329
PCT Pub. Date: Jan. 10, 2013

(65) Prior Publication Data
US 2014/0162109 A1      Jun. 12, 2014

(51) Int. Cl.
*H01M 2/16*     (2006.01)
*H01M 10/052*   (2010.01)
*H01M 2/34*     (2006.01)

(52) U.S. Cl.
CPC ....... *H01M 2/1686* (2013.01); *H01M 2/1653* (2013.01); *H01M 2/1673* (2013.01); *H01M 2/348* (2013.01); *H01M 10/052* (2013.01)

(58) Field of Classification Search
CPC .. H01M 2/1686; H01M 2/348; H01M 2/1653; H01M 2/1673
USPC ......................................................... 429/144
See application file for complete search history.

(56) References Cited

U.S. PATENT DOCUMENTS

| 4,650,730 A | 3/1987 | Lundquist et al. |
| 4,731,304 A | 3/1988 | Lundquist et al. |
| 2004/0086782 A1* | 5/2004 | Zhang ................. H01M 2/1653 429/142 |

(Continued)

FOREIGN PATENT DOCUMENTS

| CN | 1947288 | 4/2007 |
| CN | 201122622 | 9/2008 |

(Continued)

OTHER PUBLICATIONS

Arora, P. et al., "Battery Separators," Chem. Rev. 2004, vol. 104, pp. 4419-4462.

*Primary Examiner* — Sean P Cullen
(74) *Attorney, Agent, or Firm* — Finnegan, Henderson, Farabow, Garrett & Dunner, LLP (57) ABSTRACT

Provided is a very safe secondary battery that can prevent the occurrence of battery abnormalities even when the internal battery temperature increases due to, for example, overcharging. A separator 70 in this secondary battery has a laminated structure that is provided with at least two porous layers 76A, 72, 76B, wherein one of these layers forms a porous electroconductive layer 72 in which an electroconductive material 74 is dispersed in the porous layer.

7 Claims, 4 Drawing Sheets

(56) References Cited

U.S. PATENT DOCUMENTS

| | | |
|---|---|---|
| 2007/0202405 A1 | 8/2007 | Shizuka et al. |
| 2010/0233523 A1* | 9/2010 | Jo .............................. B32B 5/26 |
| | | 429/144 |

FOREIGN PATENT DOCUMENTS

| | | |
|---|---|---|
| JP | 02251545 A * | 10/1990 |
| JP | 4-38101 | 6/1992 |
| JP | 2006-244921 | 9/2006 |
| JP | 2006-269358 | 10/2006 |
| JP | 2009-146810 | 7/2009 |

* cited by examiner

SECONDARY BATTERY INCLUDING SEPARATOR CONTAINING ELECTROCONDUCTIVE POROUS LAYER SANDWICHED BETWEEN ELECTROCONDUCTIVE MATERIAL-FREE POROUS LAYERS

TECHNICAL FIELD

The present invention relates to a secondary battery. More particularly, the present invention relates to a secondary battery that is equipped with a separator that has a multilayer structure.

BACKGROUND ART

Lithium ion secondary batteries, nickel hydride batteries, and other secondary batteries are increasing in importance as power sources mounted in vehicles that use electricity as a drive power source and as power sources for personal computers, portable electronic devices, and other electrical products. In particular, lithium ion secondary batteries, which are light weight and provide a high energy density, are preferred for vehicle-mounted high-output power sources.

A separator for preventing short-circuiting between the two electrodes is disposed between the positive electrode and the negative electrode in these lithium ion secondary batteries. In addition, due to the impregnation of an electrolyte (electrolyte solution) into the pores in this separator, the separator functions to form an ion conduction path (conduction pathway) between the two electrodes.

Separators having a porous layer constituted of a polyolefin polymer, e.g., polyethylene, polypropylene, and so forth, are conventionally used as separators. These separators also have a so-called shutdown function and operate to prevent temperature increases within the battery. Thus, with such a separator having a porous layer constituted of a thermoplastic polymer, when the polymer's melting point (shutdown temperature) is reached due to an increase in the internal battery temperature due to, for example, overcharging, the polymer melts or softens and the pores are then filled and ion conduction between the two electrodes is stopped. As a result, charge/discharge by the battery is forcibly halted and a further rise in temperature can be prevented. Patent Literature 1 is provided as conventional art for separators.

CITATION LIST

Patent Literature

Patent Literature 1: Japanese Patent Application Laid-open No. 2006-244921

SUMMARY OF INVENTION

However, in those instances where the internal battery temperature has risen due to, for example, overcharging, and the shutdown function of the separator has been activated, the separator itself may also undergo heat shrinkage when, for example, little heat dissipation occurs within the battery. When a large degree of heat shrinkage occurs, the coverage area by the separator may decline and/or the separator itself may undergo rupture (film rupture), and the positive electrode may then come into direct contact with the negative electrode and a short circuit may be produced, resulting in the occurrence of abnormalities in the battery.

The present invention was therefore created in order to solve the problem identified above and takes as an object the introduction of a very safe secondary battery that can prevent the occurrence of abnormalities in the battery even when the internal battery temperature has undergone an increase due to, for example, overcharging.

In order to realize this object, the present invention provides a secondary battery that is provided with a positive electrode, a negative electrode, and a separator interposed between this positive electrode and negative electrode. That is, the separator in the herein disclosed secondary battery has a laminate structure that is provided with at least two porous layers each mainly constituted of a polymer, the polymers being the same or differing from each other, wherein one of the at least two porous layers forms a porous electroconductive layer in which an electroconductive material is dispersed in the porous layer.

The secondary battery of the present invention is provided with a separator having a laminate structure in which an electroconductive material is present in one layer of at least two porous layers.

This separator in the secondary battery according to the present invention is provided with an electroconductive material-free porous layer and as a consequence can prevent the short-circuiting that is caused by direct contact between the positive electrode and negative electrode. In addition, when the melting point of the polymer constituting the porous electroconductive layer is reached due to an increase in the internal battery temperature due to, for example, overcharging, this polymer melts and the shutdown function is exhibited, and at the same time the electroconductive material in the porous electroconductive layer migrates with the molten polymer to within the pores in the electroconductive material-free porous layer. The migrated electroconductive material links from the edge of the separator on the positive electrode side to the edge of the separator on the negative electrode side to form a plurality of microfine electroconductive pathways that connect the positive electrode with the negative electrode. The formation of these microfine electroconductive pathways results in the production of microfine short circuits between the positive electrode and negative electrode, and the dispersion and consumption of the thermal energy, and the rise in the internal battery temperature can be inhibited as a consequence.

The present invention is thus able to provide a secondary battery that is free of the occurrence of abnormalities caused by a rise in the internal battery temperature when a battery abnormality, e.g., overcharging, occurs, and that thus has an excellent safety and an excellent reliability.

In a preferred embodiment, the separator has a three-layer structure provided with the one porous electroconductive layer, and electroconductive material-free porous layers laminated on two sides of the porous electroconductive layer and each mainly constituted of a polymer, the polymers being the same or differing from each other.

In another favorable embodiment of the herein disclosed secondary battery, the melting point of the polymer constituting the porous electroconductive layer is lower than the melting point of the polymer constituting the electroconductive material-free porous layers.

Since this structure has layers with different melting points, a two-stage shutdown becomes possible. In addition, since the polymer in the porous electroconductive layer melts earlier when the internal battery temperature rises, the electroconductive material in the porous electroconductive layer can migrate into the electroconductive material-free porous layer prior to the melting of the electroconductive material-free porous layer (i.e., in a state in which the form of the porous layer has been retained), thereby enabling the formation of the plurality of microfine electroconductive pathways. Accordingly, an increase in the internal battery temperature can be reliably suppressed while short-circuiting due to direct contact between the positive electrode and the negative electrode can be stopped.

In a preferred embodiment, the polymer constituting the porous electroconductive layer is polyethylene (PE) and the polymer constituting the electroconductive material-free porous layers is polypropylene (PP).

With such a separator, two stages can be established for the shutdown temperature, i.e., the melting point of the PE (generally about 125 to 135° C.) and the melting point of the PP (generally about 155 to 165° C.), thereby providing an even safer separator.

In another favorable embodiment of the herein disclosed secondary battery, and using 100 mass % for the porous electroconductive layer, the percentage content of the electroconductive material present in the porous electroconductive layer is greater than 3 mass % and less than 50 mass %.

This percentage content for the electroconductive material is from at least 8 mass % to not more than 40 mass % in a more preferred embodiment.

Using such a structure, the separator has a satisfactory strength as a separator and the plurality of microfine electroconductive pathways necessary to suppress a rise in the internal battery temperature can be formed.

The electroconductive material is a carbon material in another favorable embodiment of the herein disclosed secondary battery. Due to their excellent electroconductivity, carbon materials, e.g., carbon powder, carbon fiber, and so forth, can be favorably used to form the microfine electroconductive pathways.

In another favorable embodiment of the herein disclosed secondary battery, the average pore diameter of the electroconductive material-free porous layer is 0.05 µm to 0.5 µm, and the average particle diameter of the electroconductive material present in the porous electroconductive layer is 0.01 µm to 0.1 µm and is not larger than the average pore diameter.

Such a structure makes it possible to form, when the internal battery temperature has risen, electroconductive pathways that can produce microfine short circuits between the positive electrode and the negative electrode.

In this Description, the "average pore diameter" refers, when the pore formed in the porous layer (including the porous electroconductive layer) has an approximately circular shape (including approximately elliptical shapes), to the average value of the diameter of this approximately circular shape (the major diameter for an approximately elliptical shape), and, when the pore has an approximately square shape (including approximately rectangular shapes), refers to the average value of an edge of this approximately square shape (the long edge for an approximately rectangular shape). This measurement can be carried out by observation of at least a portion of the surface of the porous layer (including the porous electroconductive layer) using, for example, a scanning electron microscopic (SEM) image.

In this Description, the "average particle diameter" refers to the median diameter (d50) and can be readily measured using a commercially available particle size distribution analyzer based on various laser diffraction • scattering techniques.

A preferred application for the herein disclosed art is a lithium ion secondary battery fabricated using a positive electrode that contains a positive electrode active material usable in lithium ion secondary batteries, a negative electrode that contains a negative electrode active material usable in lithium ion secondary batteries, and an electrolyte solution.

Such a secondary battery is advantageously used, for example, as a battery mounted in a vehicle, for example, an automobile. The present invention therefore provides a vehicle that is equipped with any of the herein disclosed secondary batteries. In particular, because a light weight and a high output are obtained, this is advantageously a vehicle (for example, an automobile) in which this secondary battery is a lithium ion secondary battery and in which this lithium ion secondary battery is provided as a power source (typically as a power source for a hybrid vehicle or an electric vehicle).

DESCRIPTION OF EMBODIMENTS

Preferred embodiments of the present invention are described in the following. Matters required for the execution of the present invention, but not included in the matters particularly described in this Description, can be understood as design matters for the individual skilled in the art based on the conventional art in the pertinent field. The present invention can be implemented based on the contents disclosed in this Description and the common general technical knowledge in the pertinent field.

The example of the lithium ion secondary battery is described in detail as a preferred embodiment of the herein disclosed secondary battery, but this should not be taken to imply that the applications of the present invention are limited to this type of secondary battery. The present invention can be applied to other types of secondary batteries (including, for example, secondary batteries in which the charge carrier is a metal ion other than the lithium ion, as well as electric double-layer capacitors (physical batteries), e.g., lithium ion capacitors).

The separator in the secondary battery provided by the present invention characteristically has a laminate structure that is provided with at least two porous layers each mainly constituted of a polymer, the polymers being the same or differing from each other, wherein one of the at least two porous layers forms a porous electroconductive layer in which an electroconductive material is dispersed in the porous layer.

Figure 3:
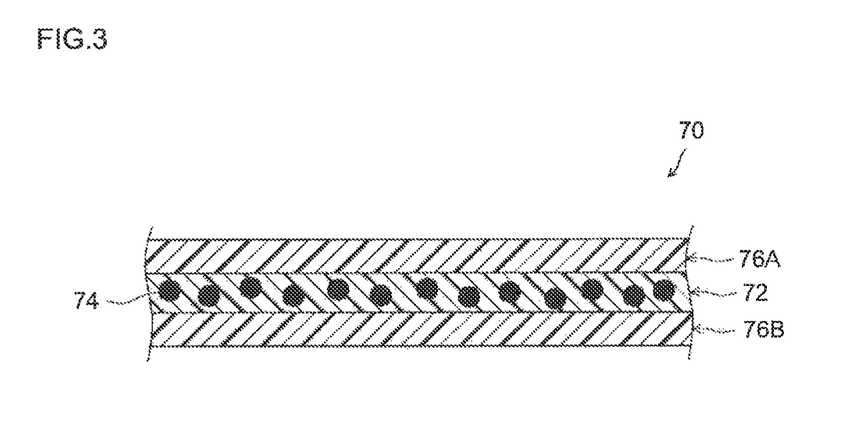
FIG. 3 is a cross-sectional diagram that schematically shows the structure of a separator according to an embodiment of the present invention.

The separator used in the herein disclosed secondary battery is described first. FIG. 3 is a cross-sectional diagram that schematically illustrates the structure of a separator 70 according to this embodiment.

As shown in FIG. 3, the separator 70 according to this embodiment has a three-layer structure in which three porous layers 76A, 72, 76B are laminated, and is provided with a porous electroconductive layer 72 in which an electroconductive material 74 is dispersed in the porous layer, and electroconductive material-free porous layers 76A, 76B laminated on the two sides of this porous electroconductive layer 72 and each mainly constituted of a polymer, the polymers being the same or differing from each other. This separator 70 is typically formed into a long sheet shape, but is not limited to this embodiment and may be processed into various configurations in conformity with the configuration of the secondary battery in which the separator 70 is used.

For example, a polyolefin-type thermoplastic polymer, such as polyethylene (PE), polypropylene (PP), and so forth, can be favorably used as the polymer in the electroconductive material-free porous layers 76A, 76B and the porous electroconductive layer 72. The melting point of the polymer constituting the porous electroconductive layer 72 is preferably lower than the melting point of the polymer constituting the electroconductive material-free porous layers 76A, 76B. Such a structure makes possible a two-stage shutdown due to the difference between the melting points of the polymers that constitute the individual layers, and, as is described below, due to the melting of the polymer in the porous electroconductive layer 72, enables the formation of a plurality of microfine electroconductive pathways 79 (refer to FIG. 4B) through the inflow (migration) of the electroconductive material 74 dispersed within the porous electroconductive layer 72 into the pores 78A, 78B (refer to FIG. 4A) of the electroconductive material-free porous layers 76A, 76B, which retain their shape.

The electroconductive material-free porous layers 76A, 76B are preferably constituted of a PP with a melting point of approximately 150° C. to 170° C. (for example, approximately 155° C. to 165° C.). This PP can be exemplified by isotactic polypropylene and syndiotactic polypropylene. The two electroconductive material-free porous layers 76A, 76B may have the same melting point or may have different melting points. The two electroconductive material-free porous layers 76A, 76B typically have about the same melting point.

In addition, the porous electroconductive layer 72 is preferably constituted of a PE with a melting point of approximately 120° C. to 140° C. (for example, approximately 125° C. to 135° C.). This PE can be exemplified by the polyethylenes known as high-density polyethylene and straight-chain (linear) low-density polyethylene.

A long, monoaxially stretched or biaxially stretched porous polymer film can favorably be used as the electroconductive material-free porous layers 76A, 76B and the porous electroconductive layer 72. Porous polymer films that have been monoaxially stretched in the longitudinal direction are particularly preferred here because they have a low heat shrinkage in the width direction while being provided with a favorable strength. For example, when a separator is used that has a porous polymer film that has been monoaxially stretched in the longitudinal direction, the heat shrinkage in the longitudinal direction can also be suppressed in a format in which it is wound with a long positive electrode sheet and a long negative electrode sheet. Thus, a porous polymer film that has been monoaxially stretched in the longitudinal direction is particularly suitable as one material in a separator in such a wound electrode assembly.

The thickness of the separator 70 (i.e., the total thickness of the porous layer(s) and the porous electroconductive layer) is preferably, for example, approximately 10 μm to 30 μm (for example, approximately 16 μm to 20 μm). The porous layer thickness and porous electroconductive layer thickness each are, for example, approximately 4 μm to 10μ, and these thicknesses may be the same as each other or may differ from one another. The ionic conductivity of the separator 70 may decline when the thickness of the separator 70 is too much greater than 30 μm. On the other hand, when the thickness of the separator 70 is too much less than 10 μm, the separator 70 itself may then undergo rupture (film rupture) during charge/discharge. The thickness of the separator 70 can be determined by carrying out image analysis on the SEM image.

The total porosity of the separator 70 is preferably, for example, approximately 40% to 65% (preferably approximately 45% to 55%). While porosity is expressed in volume % (vol %), it will be expressed simply by % below. The electroconductive material-free porous layers 76A, 76B preferably have a porosity of approximately 35% to 50%, while the porous electroconductive layer 72 preferably has a porosity of approximately 45% to 65%. When the aforementioned total porosity is too low, little electrolyte solution can be retained in the separator 70 and the ionic conductivity may decline. When, on the other hand, the total porosity is too large, the separator 70 has an inadequate strength and film rupture may then be prone to occur.

The "porosity" here can be calculated as follows. The description uses the electroconductive material-free porous layer 76A as an example. V1 [cm$^3$] is defined as the apparent volume taken up by a unit area (size) of the electroconductive material-free porous layer 76A, and W [g] is defined as the mass of this unit area of the electroconductive material-free porous layer 76A. V0 is defined as the ratio between this mass W and the true density ρ [g/cm$^3$] of the polymer constituting the electroconductive material-free porous layer 76A, i.e., as W/ρ. Thus, V0 is the volume taken up by a compact body of the polymer with mass W. Given the preceding, the porosity of the electroconductive material-free porous layer 76A can be calculated using (V1−V0)/V1× 100. In addition, the "porosity" is a value that can be measured using an x-ray CT scanner.

The average pore diameter of the electroconductive material-free porous layers 76A, 76B is preferably approximately 0.05 μm to 0.5 μm (for example, approximately 0.1 μm to 0.2 μm). The strength of the separator 70 may decline when the average pore diameter is too much larger than 0.5 μm. On the other hand, a satisfactory ionic conductivity may not be obtained when the average pore diameter is too much less than 0.05 μm.

In addition, with the goal of making the porosity of the porous electroconductive layer 72 higher than the porosity of the electroconductive material-free porous layers 76A, 76B, the average pore diameter of the porous electroconductive layer 72 is preferably larger than the average pore diameter of the electroconductive material-free porous layers 76A, 76B and is preferably approximately 0.1 μm to 1 μm (for example, approximately 0.15 μm to 0.3 μm).

A carbon material, e.g., carbon powder and so forth, is preferably used for the electroconductive material 74 incorporated in the porous electroconductive layer 72 of the herein disclosed separator 70. Carbon powders such as various carbon blacks (for example, acetylene black, furnace black, Ketjen black, and so forth) and graphite powder can be used as this carbon powder. In addition, electroconductive fibers, e.g., carbon fiber, metal fiber, and so forth, and metal powders, e.g., of copper or nickel, can be incorporated individually or as their mixtures. Only one species of the preceding may be used or two or more species may be used in combination.

The average particle diameter of this electroconductive material 74 is approximately 0.01 µm to 0.1 µm (for example, 0.04 µm to 0.06 µm) and is not larger than the average pore diameter of the electroconductive material-free porous layers 76A, 76B. When the average particle diameter of the electroconductive material 74 significantly exceeds the average pore diameter of the electroconductive material-free porous layers 76A, 76B, the electroconductive material 74 cannot migrate into the pores 78A, 78B (refer to FIG. 4A) in the electroconductive material-free porous layers 76A, 76B when the polymer formed into a porous configuration constituting the porous electroconductive layer 72 has undergone melting upon an increase in the internal battery temperature due to, for example, overcharging, and the microfine electroconductive pathways 79 (refer to FIG. 4B) that connect the positive electrode and the negative electrode may then be unable to form within the separator 70.

The percentage content of the electroconductive material 74 incorporated in the porous electroconductive layer 72 is preferably greater than 3 mass % and less than 50 mass % using 100 mass % for the porous electroconductive layer. It is more preferably in the range from at least 8 mass % to not more than 40 mass %. When the percentage content of the electroconductive material 74 is too much greater than 50 mass %, the strength of the porous electroconductive layer 72 may not be adequate when the porous electroconductive layer 72 is formed from the electroconductive material 74 and a thermoplastic polymer and the ability to function as a separator 70 may not be present. When, on the other hand, the percentage content of the electroconductive material 74 is too much less than 3 mass %, the amount of electroconductive material 74 is inadequate even when the polymer constituting the porous electroconductive layer 72 melts and the electroconductive material 74 migrates to the pores 78A, 78B (refer to FIG. 4A) of the electroconductive material-free porous layers 76A, 76B, and formation of the microfine electroconductive pathways 79 (refer to FIG. 4B) that connect the positive electrode and the negative electrode may then not occur.

The herein disclosed separator 70 can be produced according to heretofore known methods. For example, a mixture can be prepared that contains an electroconductive material (for example, acetylene black) and a thermoplastic polymer (for example, polyethylene) as the component that forms the porous electroconductive layer; a thermoplastic polymer (for example, polypropylene) can be prepared as the component that forms the porous layer; and a film with a laminate structure can be molded by the simultaneous melt extrusion of these components. After molding, the film can be subjected to a monoaxial stretch or a biaxial stretch to porosify the individual layers and form the separator 70 having a laminate structure provided with the porous electroconductive layer 72 and the electroconductive material-free porous layer 76A (76B).

The function (operation, effects) of the separator 70 according to this embodiment during a rise in internal battery temperature induced by, for example, overcharging, will now be described.

Figure 4A:
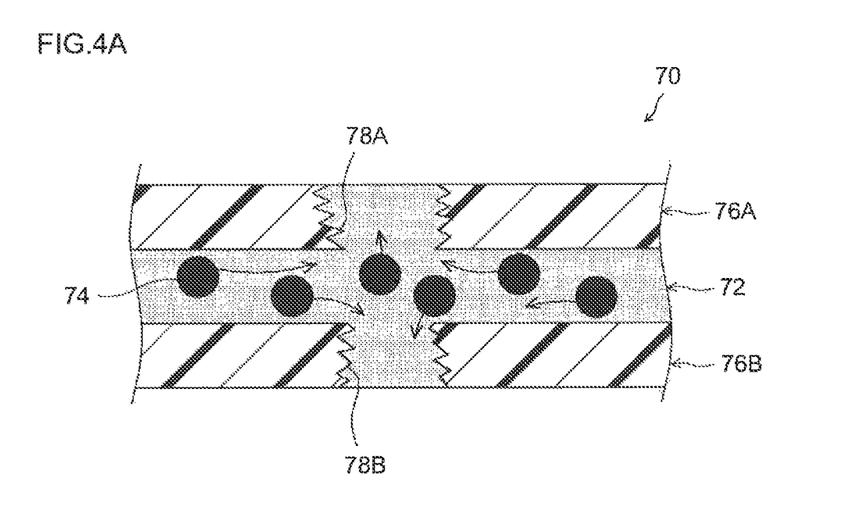
FIG. 4A is a descriptive diagram that schematically shows a state in which the electroconductive material within the porous electroconductive layer migrates to the pores in the porous layer when the internal battery temperature has risen.
Figure 4B:
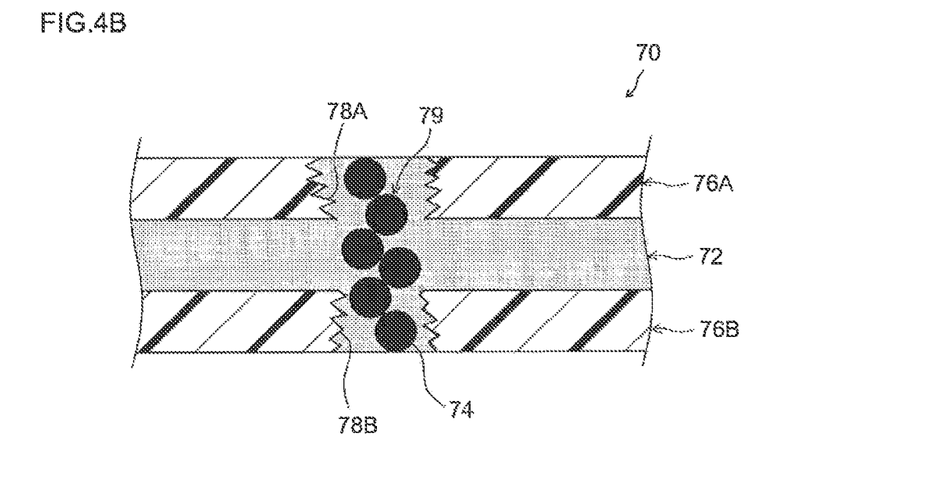
FIG. 4B is a descriptive diagram that schematically shows a state in which a microfine electroconductive pathway has been formed by the electroconductive material from one surface of the separator to the other surface.

With reference to the lithium ion secondary battery (secondary battery) 10 (refer to FIG. 2), when the temperature within the battery 10 rises due to, for example, overcharging, the polymer formed into a porous configuration constituting the porous electroconductive layer 72 of the separator 70 undergoes melting first. The pores in the porous electroconductive layer 72 are closed off (i.e., shutdown) by this melting of the polymer and lithium ion migration between the positive electrode and the negative electrode is inhibited. Furthermore, as shown in FIG. 4A, the electroconductive material 74 incorporated in the porous electroconductive layer 72 migrates together with the molten polymer and flows into the pore 78A of the electroconductive material-free porous layer 76A and the pore 78B of the electroconductive material-free porous layer 76B. In addition, as shown in FIG. 4B, the electroconductive material 74 that has flowed into the pores 78A, 78B forms a bridge, considered in the stacking direction, from one edge of the separator 70 (the side in contact with a positive electrode sheet 64) to the other edge (the side in contact with a negative electrode sheet 84) to form a microfine electroconductive pathway 79 between the positive electrode sheet 64 and the negative electrode sheet 84. Due to the formation of a plurality of such microfine electroconductive pathways 79 in the separator 70, microfine short circuits are produced at a plurality of locations between the positive electrode sheet 64 and the negative electrode sheet 84 and the thermal energy is dispersed and consumed, and as a consequence the rise in the internal battery temperature can be suppressed.

An inorganic filler layer having an inorganic filler and a binder may be disposed on at least either surface of the electroconductive material-free porous layers 76A, 76B of the separator 70. The inorganic filler layer contains an inorganic filler and a binder, wherein the binder provides bonding between the inorganic filler particles and between the inorganic filler particles and the electroconductive material-free porous layers 76A, 76B. The inorganic filler layer has a large number of pores in locations not bonded by the binder, and the ions can travel through the inorganic filler layer by the linkage or chaining of these pores. In addition, the inorganic filler layer has a heat resistance sufficient to not melt in the temperature range (for example, 300° C. to 1000° C. or higher) above that for the electroconductive material-free porous layers 76A, 76B and the porous electroconductive layer 72.

The inorganic filler used in this inorganic filler layer preferably has a high melting point (for example, a melting point of at least 1000° C.) and an excellent heat resistance and is electrochemically stable within the range of use for the battery. Such inorganic fillers can be exemplified by metal oxides such as alumina ($Al_2O_3$), boehmite ($Al_2O_3.H_2O$), magnesia (MgO), zirconia ($ZrO_2$), and so forth. A single one of these inorganic fillers may be used or two or more may be used. The use of alumina is preferred thereamong.

Due to the high melting points and excellent heat resistance of these inorganic fillers, heat shrinkage (thermal deformation) by the separator 70 is inhibited by the formation, on at least either surface of the electroconductive material-free porous layers 76A, 76B, of the inorganic filler layer comprising such an inorganic filler. The volume-based average particle diameter (d50) of the inorganic filler is suitably approximately 0.05 μm to 1.5 μm and preferably approximately 0.1 μm to 1 μm.

The binder used in the inorganic filler layer serves to bond the inorganic filler particles to each other, and the material itself that constitutes this binder is not particularly limited and a wide range of binders may be used. Acrylic polymers are a favorable example. A homopolymer provided by the polymerization of one species of monomer, e.g., acrylic acid, methacrylic acid, acrylamide, methacrylamide, and so forth, is preferably used as the acrylic polymer. The acrylic polymer may also be a copolymer as provided by the polymerization of two or more of the preceding monomers. It may also be a mixture of two or more of these homopolymers and copolymers. In addition to these acrylic polymers, for example, styrene-butadiene rubber (SBR), polytetrafluoroethylene (PTFE), polyacrylonitrile, polymethyl methacrylate, polyvinylidene fluoride, and so forth, may also be used.

As necessary the inorganic filler layer may also contain a thickener. Considering the case of use of an aqueous solvent, this thickener can be exemplified by carboxymethyl cellulose (CMC) and polyethylene oxide (PEO).

While not particularly limited, the proportion of the inorganic filler in the inorganic filler layer as a whole is preferably at least approximately 90 mass % (typically 90 mass % to 99 mass %) and is preferably approximately 95 mass % to 99 mass % and particularly preferably is approximately 97 mass % to 99 mass %. When the proportion of the inorganic filler is too small, the heat resistance of the inorganic filler layer declines and it may then not be possible to suppress the heat shrinkage of the separator 70. When, on the other hand, the proportion of the inorganic filler is too large, since the amount of binder in the inorganic filler layer is correspondingly reduced, the strength of the inorganic filler layer may be reduced and/or the adhesiveness with the separator 70 may be reduced. Viewed from the standpoint of maintaining the heat resistance, the proportion of the binder in the inorganic filler layer as a whole is suitably not more than approximately 10 mass % and generally is preferably not more than 5 mass % (typically 1 to 5 mass %). When the inorganic filler layer has a composition that contains a thickener, the proportion of the thickener in this inorganic filler layer can be not more than approximately 5 mass % and is preferably, for example, not more than 2 mass % (typically 0.5 to 2 mass %).

The porosity of this inorganic filler layer is approximately 40% to 70% and is preferably 45% to 60%. By having the porosity within this prescribed range, an inorganic filler layer can be provided that has both an excellent ionic permeability and a high mechanical strength.

The thickness of the inorganic filler layer can be selected as appropriate in conformity to the application, but, for example, is suitably 1 μm to 20 μm, preferably 3 μm to 10 μm, and particularly preferably 2 μm to 8 μm. When the inorganic filler layer is too thin, it may not be possible to suppress the heat shrinkage of the separator 70. When, on the other hand, the inorganic filler layer is too thick, the resistance after high-rate charge/discharge cycling may be increased.

The method of forming the inorganic filler layer will now be considered. In order to form the inorganic filler layer, a paste-form composition provided by mixing and dispersing the inorganic filler, the binder, and a solvent (for example, N-methylpyrrolidone (NMP)) is used as the composition for forming the inorganic filler layer. The inorganic filler layer can be formed by coating this composition in an appropriate amount on at least either surface of the electroconductive material-free porous layers 76A, 76B of the separator 70 and drying to remove the solvent.

An embodiment of a lithium ion secondary battery fabricated using the separator 70 is described in the following with reference to the figures; however, this should not be taken to imply that the present invention is limited to this embodiment. That is, as long as the separator 70 is used, there are no particular limitations on the shape (outer shape and size) of the fabricated lithium ion secondary battery. The following embodiment is described using the example of a lithium ion secondary battery having a structure in which a wound electrode assembly and an electrolyte solution are housed in a rectangular battery case. In the figures considered in the following, the same reference signs are assigned to members and locations that perform the same function, and duplicate descriptions may not be provided. In addition, the dimensional relationships (length, width, thickness, and so forth) in the individual figures do not necessarily reflect actual dimensional relationships.

Figure 1:
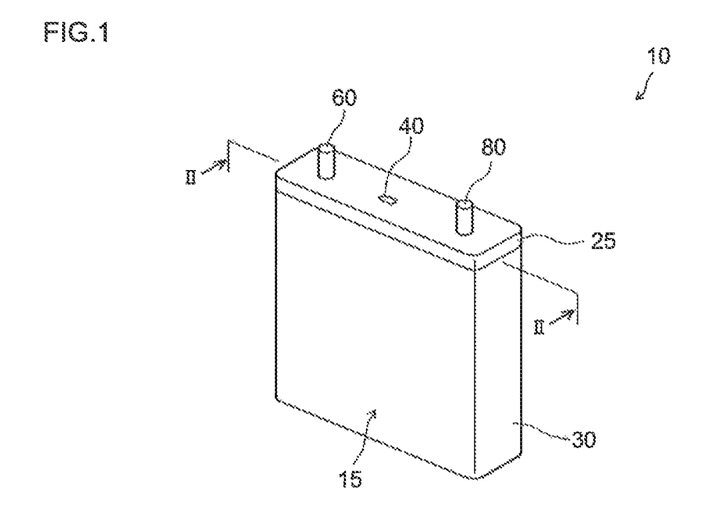
FIG. 1 is a perspective drawing that schematically shows the outer shape of a lithium ion secondary battery according to an embodiment of the present invention.
Figure 2:
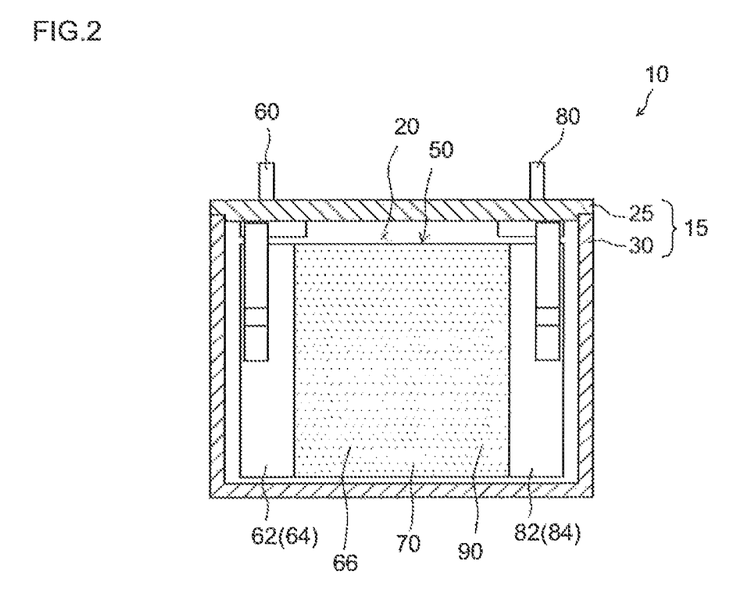
FIG. 2 is a cross-sectional diagram along the II-II line in FIG. 1.

FIG. 1 is a perspective diagram that schematically illustrates the lithium ion secondary battery (secondary battery) 10 according to this embodiment. FIG. 2 is a vertical cross-sectional diagram along the II-II line in FIG. 1.

As shown in FIG. 1, the lithium ion secondary battery 10 according to this embodiment is provided with a metal battery case 15 (fabrication from a resin or laminated film is also suitable). This case (outer container) 15 is provided with a case main body 30 that is a flat rectangular parallelepiped and that is open at the upper end and is also provided with a lid 25 that closes the opening 20 therein. The lid 25 seals the opening 20 of the case main body 30, for example, by welding. A positive electrode terminal 60 that is electrically connected to a positive electrode sheet (positive electrode) 64 of a wound electrode assembly 50 and a negative electrode terminal 80 that is electrically connected to a negative electrode sheet 84 of this electrode assembly are disposed in the upper surface (i.e., the lid 25) of the case 15. Just as for the case of a conventional lithium ion secondary battery, a safety valve 40 is disposed in the lid 25 in order to discharge from the case 15 gas that is produced within the case 15 during a battery abnormality. As shown in FIG. 2, the case 15 houses in its interior an electrolyte (for example, a nonaqueous electrolyte solution) and a flat wound electrode assembly 50 fabricated by stacking and winding a positive electrode sheet 64 and a negative electrode sheet 84 together with a total of two separator sheets 70 and then flattening the obtained winding by pressing from the side direction.

When the aforementioned stacking is carried out, as shown in FIG. 2, the stacking is performed by offsetting the positive electrode sheet 64 and the negative electrode sheet 84 somewhat in the width direction in order to expose, respectively, at the two sides of the separator sheet 70 considered in the width direction, a positive electrode active material layer-free region (i.e., a region where the positive electrode active material layer 66 has not been formed and the positive electrode current collector 62 has been exposed) on the positive electrode sheet 64 and a negative electrode active material layer-free region (i.e., a region where the negative electrode active material layer 90 has not been formed and the negative electrode current collector 82 has been exposed) on the negative electrode sheet 84. As a result, the electrode active material layer-free regions on the positive electrode sheet 64 and the negative electrode sheet 84 each are exposed to the outside from the wound core region (i.e., the region where the positive electrode mixture-bearing region of the positive electrode sheet 64, the negative electrode mixture-bearing region of the negative electrode sheet 84, and the two separator sheets 70 are tightly wound), considered in the transverse direction with respect to the winding direction for the wound electrode assembly 50. The positive electrode terminal 60 is joined to the exposed region on the positive electrode side in order to electrically connect the positive electrode terminal 60 with the positive electrode sheet 64 of the flattened wound electrode assembly 50. Similarly, the negative electrode terminal 80 is joined to the exposed region on the negative electrode side in order to electrically connect the negative electrode terminal 80 with the negative electrode sheet 84. The positive and negative electrode terminals 60, 80 can be joined, respectively, to the positive and negative electrode current collectors 62, 82 by, for example, ultrasound welding, resistance welding, and so forth.

The same nonaqueous electrolyte solutions as used in conventional lithium ion secondary batteries can be used without particular limitation as the aforementioned electrolyte. These nonaqueous electrolyte solutions typically have a composition in which a supporting salt is incorporated in a suitable nonaqueous solvent (organic solvent). A single selection or two or more selections from, for example, ethylene carbonate (EC), propylene carbonate (PC), dimethyl carbonate (DMC), diethyl carbonate (DEC), ethyl methyl carbonate (EMC), and so forth, can be used as this nonaqueous solvent. For example, a lithium salt, e.g., $LiPF_6$, $LiBF_4$, and so forth, can be used as the supporting salt (supporting electrolyte). A difluorophosphate salt ($LiPO_2F_2$) and/or lithium bis(oxalato)borate (LiBOB) may also be dissolved in this nonaqueous electrolyte solution.

The positive electrode active material layer 66 is preferably fabricated by, for example, preparing a paste-form composition (this paste-form composition encompasses slurry-form compositions and ink compositions) by dispersing and mixing a positive electrode active material, an electroconductive material, a binder, and so forth, in a suitable solvent; coating this composition on a positive electrode current collector 62; and drying.

The positive electrode active material is a material capable of storing and releasing the lithium ion and can be exemplified by lithium-containing compounds that contain the element lithium and one or two or more transition metal elements (for example, a lithium transition metal complex oxide). Examples are lithium nickel complex oxides (for example, $LiNiO_2$), lithium cobalt complex oxides (for example, $LiCoO_2$), lithium manganese complex oxides (for example, $LiMn_2O_4$), and ternary lithium-containing complex oxides such as lithium nickel cobalt manganese complex oxide (for example, $LiNi_{1/3}Co_{1/3}Mn_{1/3}O_2$).

A polyanion-type compound as represented by, for example, $LiMPO_4$ or $LiMVO_4$ or $Li_2MSiO_4$ (M in the formulas is at least one or more elements selected from Co, Ni, Mn, and Fe) may also be used as the positive electrode active material (for example, $LiFePO_4$, $LiMnPO_4$, $LiFeVO_4$, $LiMnVO_4$, $Li_2FeSiO_4$, $Li_2MnSiO_4$, and $Li_2CoSiO_4$).

The electroconductive materials heretofore used in this type of lithium ion secondary battery may be used as the aforementioned electroconductive material, and there is no limitation to a particular electroconductive material. For example, the same electroconductive material as present in the previously described porous electroconductive layer 72 can suitably be used.

The same binders as used in the positive electrodes of common lithium ion secondary batteries can be used as appropriate for the binder. For example, when a solvent-based paste is used as the composition for forming the positive electrode active material layer 66, a polymer that dissolves in an organic solvent (a nonaqueous solvent), e.g., polyvinylidene fluoride (PVDF) or polyvinylidene chloride (PVDC), can be used. Or, when a water-based paste-form composition is used, a polymer that dissolves or disperses in water can preferably be used. Examples here are polytetrafluoroethylene (PTFE) and carboxymethyl cellulose (CMC). The polymers provided in the preceding as examples, in addition to their use as a binder, can also be used as a thickener for the composition or as other additives.

Here, a "solvent-based paste-form composition" is a concept that indicates a composition in which the dispersion medium for the positive electrode active material is mainly an organic solvent. For example, N-methylpyrrolidone (NMP) can be used as this organic solvent. A "water-based paste-form composition" is a concept that indicates a composition in which water or a mixed solvent of mainly water is used as the dispersion medium for the positive electrode active material. The solvent other than water present in such a mixed solvent can be one or two or more suitable selections from organic solvents that can be uniformly mixed with water (lower alcohols, lower ketones, and so forth).

An electroconductive member composed of a metal having an excellent electroconductivity, as in the current collectors used in the positive electrodes of conventional lithium ion secondary batteries, is preferably used as the positive electrode current collector 62. For example, aluminum or an alloy composed mainly of aluminum can be used. The shape of the positive electrode current collector will vary in conformity to, for example, the shape of the lithium ion secondary battery, and thus is not particularly limited and various configurations are possible, e.g., rod, plate, sheet, foil, and mesh. The herein disclosed art can be favorably used to produce electrodes that use a sheet-shaped or foil-shaped current collector.

The negative electrode active material layer 90 is preferably fabricated by, for example, preparing a paste-form composition by dispersing and mixing a negative electrode active material, a binder, as necessary a thickener, and so forth, in a suitable solvent; coating this composition on a negative electrode current collector 82; and drying.

One or two or more of the materials used in conventional lithium ion secondary batteries can be used without particular limitation as this negative electrode active material. Examples are carbonaceous materials such as graphitic carbon, amorphous carbon, and so forth; lithium transition metal complex oxides (e.g., lithium titanium complex oxide and so forth); and lithium transition metal complex nitrides. Among these, a negative electrode active material in which the main component is natural graphite or artificial graphite is preferably used. This graphite may be a flake graphite that has been sphericized. For example, a sphericized natural graphite (or sphericized artificial graphite) having an average particle diameter in the range of approximately 5 μm to 30 μm can preferably be used for the negative electrode active material. Also usable are carbonaceous powders provided by coating an amorphous carbon (noncrystalline carbon) on the surface of these graphite particles.

The same binders as used in the negative electrodes of common lithium ion secondary batteries can be used as appropriate as the aforementioned binder. For example, when a water-based paste-form composition is used to form the negative electrode active material layer, a polymer that dissolves or disperses in water is preferably used. Polymers that disperse in water (i.e., water-dispersible polymers) can be exemplified by rubbers such as styrene-butadiene rubber (SBR) and fluororubbers; polyethylene oxide (PEO); fluoropolymers such as polytetrafluoroethylene (PTFE); and vinyl acetate copolymers.

A polymer that dissolves or disperses in water or solvent (organic solvent) can be used as the aforementioned thickener. Polymers that dissolve in water (i.e., water-soluble polymers) can be exemplified by cellulosic polymers such as carboxymethyl cellulose (CMC), methyl cellulose (MC), cellulose acetate phthalate (CAP), and hydroxypropylmethyl cellulose (HPMC), and by polyvinyl alcohol (PVA) and so forth.

An electroconductive member composed of a metal having an excellent electroconductivity, as in the current collectors used in the negative electrodes in conventional lithium ion secondary batteries, is preferably used as the negative electrode current collector 82. For example, copper or nickel or an alloy having these as its major component can be used. The shape of the negative electrode current collector can be the same as the shape of the positive electrode current collector.

Figure 5:
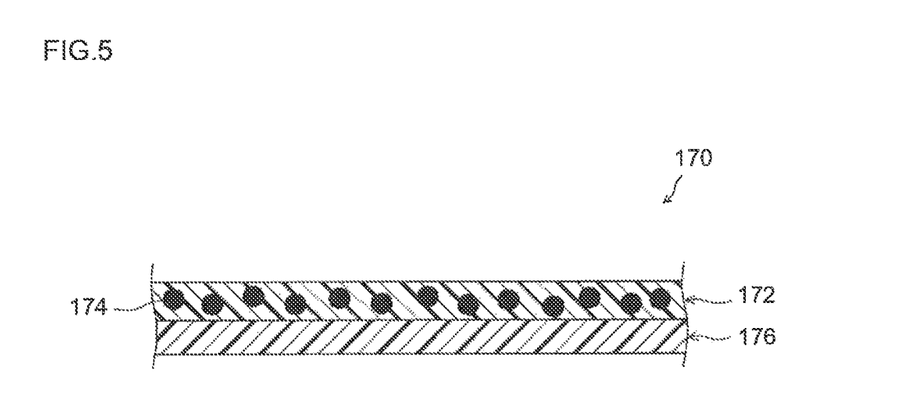
FIG. 5 is a cross-sectional diagram that schematically shows the structure of a separator according to another embodiment.

The separator 70 according to the first embodiment that has been described above has a three-layer structure in which three porous layers are laminated, but the separator is not limited to three layers and may have two layers or four or more layers. FIG. 5 is a cross-sectional diagram that schematically illustrates the structure of a separator 170 that has a two-layer structure in which two porous layers 172, 176 are laminated.

As shown in FIG. 5, the separator 170 according to this embodiment has a two-layer structure in which there are laminated two porous layers 176, 172 each mainly constituted of a polymer, the polymers being the same or differing from each other, and the two-layer structure is provided with a porous electroconductive layer 172 in which an electroconductive material 174 is dispersed in the porous layer and an electroconductive material-free porous layer 176 laminated on a surface of the porous electroconductive layer 172.

This structure provides the same effects as for the first embodiment. When an inorganic filler layer is formed on a surface of the separator 170 according to this embodiment, it is preferably formed on at least the surface of the porous electroconductive layer 172.

Examples of the present invention are described in the following, but this should not be taken to imply that the present invention is limited to that which is shown in these examples.

The Separator Sheet

Example 1

A mixture was prepared at a mass ratio of 97:3 from polyethylene (thermoplastic polymer) and acetylene black (electroconductive material) having an average particle diameter of 0.04 µm as the component for forming the porous electroconductive layer; polypropylene (thermoplastic polymer) was prepared as the component for forming the porous layer; and, using a T-die extruder, a film having a three-layer structure in which a porous layer (also referred to below as the "PP layer") was formed on both sides of a porous electroconductive layer (also referred to below as the "electroconductive layer"), was molded by the simultaneous melt extrusion of these components. After molding, this film was stretched in the longitudinal direction of the film (monoaxial stretch) to produce the separator sheet according to Example 1. The total porosity of the separator in this example was 52%. The thickness of the porous electroconductive layer was 7 µm and its average pore diameter was 0.2 µm, and the thickness of the porous layer was 7 µm and its average pore diameter was 0.1 µm.

A composition for forming an inorganic filler layer was prepared by dispersing alumina powder (average particle diameter (d50)=0.3 µm, purity=99.99%) as an inorganic filler, an acrylic polymer as a binder, and carboxymethyl cellulose (CMC) as a thickener in water to provide a mass ratio among these materials of 96:3:1. An inorganic filler layer was formed by coating this composition for forming an inorganic filler layer using a gravure roll on the surface of a porous layer and drying. The thickness of the inorganic filler layer was 5 µm and its porosity was 60%. This resulted in the fabrication of an inorganic filler layer-bearing separator sheet according to Example 1 having a thickness of 26 µm.

Example 2

An inorganic filler layer-bearing separator sheet according to Example 2 was fabricated proceeding as in Example 1, but using a mixture in a mass ratio of 92:8 of a polyethylene and an acetylene black with an average particle diameter of 0.04 µm as the component for forming the porous electroconductive layer.

Example 3

An inorganic filler layer-bearing separator sheet according to Example 3 was fabricated proceeding as in Example 1, but using a mixture in a mass ratio of 80:20 of a polyethylene and an acetylene black with an average particle diameter of 0.04 µm as the component for forming the porous electroconductive layer.

Example 4

An inorganic filler layer-bearing separator sheet according to Example 4 was fabricated proceeding as in Example 1, but using a mixture in a mass ratio of 60:40 of a polyethylene and an acetylene black with an average particle diameter of 0.04 µm as the component for forming the porous electroconductive layer.

Example 5

An inorganic filler layer-bearing separator sheet according to Example 5 was fabricated proceeding as in Example 1, but using a mixture in a mass ratio of 40:60 of a polyethylene and an acetylene black with an average particle diameter of 0.04 µm as the component for forming the porous electroconductive layer.

Example 6

A polyethylene was prepared as the component for forming the porous electroconductive layer; a polypropylene was prepared as the component for forming the porous layer; and, using a T-die extruder, a film having a three-layer structure in which a porous layer of mainly polypropylene (PP layer) was formed on both sides of a porous layer of mainly polyethylene (also referred to below as the "PE layer"), was molded by the simultaneous melt extrusion of these components. The PE layer did not contain any electroconductive material. After molding, this film was stretched in the longitudinal direction of the film (monoaxial stretch) to produce the separator sheet according to Example 6. An inorganic filler layer-bearing separator sheet according to Example 6 was fabricated proceeding as in Example 1, but using this separator sheet.

Example 7

A polyethylene was prepared as the component for forming a porous layer (PE layer), and, using a T-die extruder, a film having a single-layer structure composed of a porous layer (PE layer) was molded by the melt extrusion of this component. After molding, this film was stretched in the longitudinal direction of the film (monoaxial stretch) to produce the separator sheet according to Example 7 having a thickness of 21 μm. An inorganic filler layer-bearing separator sheet according to Example 7 was fabricated proceeding as in Example 1, but using this separator sheet.

Example 8

An inorganic filler layer-bearing separator sheet according to Example 8 was fabricated proceeding as in Example 7, but using polypropylene as the component for forming the porous layer (PP layer).

[The Positive Electrode Sheet]

$LiNi_{1/3}Co_{1/3}Mn_{1/3}O_2$ as a positive electrode active material, acetylene black (AB) as an electroconductive material, and PVDF as a binder were weighed out in a mass ratio of 90:5:5, and a paste-form composition for forming a positive electrode active material layer was prepared by dispersing these materials in NMP. This paste was coated at a coating rate of 6 mg/cm$^2$ per one side on a 15 μm-thick positive electrode current collector (aluminum foil) and was dried, and a pressing operation was then performed to fabricate a positive electrode sheet having a positive electrode active material layer formed on the positive electrode current collector.

[The Negative Electrode Sheet]

Natural graphite having a surface coated with an amorphous carbon film, SBR as a binder, and CMC as a thickener were weighed out in a mass ratio of 98:1:1, and a paste-form composition for forming a negative electrode active material layer was prepared by dispersing these materials in ion-exchanged water. This composition was coated at a coating rate of 4 mg/cm$^2$ per one side on a negative electrode current collector (copper foil) and was dried, and a pressing operating was then performed to fabricate a negative electrode sheet having a negative electrode active material layer formed on the negative electrode current collector.

[The Lithium Ion Secondary Battery]

Two of the inorganic filler layer-bearing separator sheets according to Example 1 were stacked with the positive electrode sheet and negative electrode sheet fabricated as described above and this was wound into a cylindrical shape to obtain a wound electrode assembly according to Example 1. A lithium ion secondary battery according to Example 1 was fabricated by introducing the wound electrode assembly according to Example 1 and an electrolyte solution into a cylindrical, nickel-plated soft steel case main body having a bottom and a diameter of 18 mm, a length of 65 mm, and a thickness of 0.5 mm 1 mol/L $LiPF_6$ dissolved in a mixed solvent of ethylene carbonate (EC) and diethyl carbonate (DEC) in a volumetric ratio of 3:7 was used as the electrolyte solution. Using the inorganic filler layer-bearing separator sheets according to Examples 2 to 8, lithium ion secondary batteries according to Examples 2 to 8 were fabricated proceeding as for the lithium ion secondary battery according to Example 1 as described above. The inorganic filler layer-bearing separator sheet according to Example 6 was not strong enough to allow the fabrication of the lithium ion secondary battery.

[The Overcharging Test]

A suitable conditioning treatment (for example, an initial charge/discharge process in which the following was repeated 2 or 3 times: a step of constant-current (CC) charging for 3 hours at a charging rate of 1/10 C of the theoretical capacity of the positive electrode and additional constant-current charging to 4.1 V at a charging rate of 1/3 C; a step of constant-current discharge to 3.0 V at a 1/3 C discharge rate) was run on the lithium ion secondary batteries according to Examples 1 to 8 fabricated as described above (except for Example 5). This was followed by adjustment to a state of charge of 80% SOC in a thermostat at 60° C. Here, 1 C denotes the amount of current that can charge, in one hour, the battery capacity (Ah) predicted from the theoretical capacity of the positive electrode.

After this adjustment, each of the lithium ion secondary batteries was subjected to constant-current charging, at a temperature condition of 60° C., to an upper limit of 300% SOC at a charging rate of 4 C (i.e., this is a test in which, after the completion of charging, flow of the charging current to the lithium ion secondary battery was forcibly continued), and the presence/absence of the appearance of abnormalities (valve opening or smoke generation) was checked for each battery. The results are given in Table 1.

TABLE 1

| example | structure of the separator sheet | polymer in the electro-conductive layer [mass %] | electro-conductive material in the electro-conductive layer [mass %] | results of the overcharging test |
|---|---|---|---|---|
| Example 1 | PP layer/electro-conductive layer/PP layer | 97 | 3 | smoke generation at 320 seconds after shutdown |
| Example 2 | PP layer/electro-conductive layer/PP layer | 92 | 8 | only valve opening |
| Example 3 | PP layer/electro-conductive layer/PP layer | 80 | 20 | only valve opening |
| Example 4 | PP layer/electro-conductive layer/PP layer | 60 | 40 | only valve opening |
| Example 5 | PP layer/electro-conductive layer/PP layer | 40 | 60 | — |
| Example 6 | PP layer/PE layer/PP layer | — | — | smoke generation at 280 seconds after shutdown |
| Example 7 | PE single layer | — | — | smoke generation at 600 seconds after shutdown |
| Example 8 | PP single layer | — | — | smoke generation |

As shown in Table 1, shutdown is slow and smoke generation is reached with the secondary battery according to Example 8. In addition, with the secondary batteries according to Examples 6 and 7, while shutdown does occur, it is thought that the heat dissipation is inadequate and the separator sheet itself then ultimately undergoes heat shrinkage and smoke generation occurs. On the other hand, it was confirmed that the result was only valve opening for the secondary batteries according to Examples 2 to 4. It is thought that this is due to a reduction in heat generation and a suppression of the rise in the internal battery temperature due to the formation, by the electroconductive material present in the porous electroconductive layer, of a plurality of electroconductive pathways that in turn cause the occurrence of microfine short circuits between the positive electrode sheet and the negative electrode sheet. Based on the preceding, the lithium ion secondary batteries according to Examples 2 to 4 were shown to be very safe and highly reliable lithium ion secondary batteries that are free of the occurrence of abnormalities in these secondary batteries even when the internal battery temperature rises due to, for example, overcharging.

Specific examples of the present invention have been described in detail in the preceding, but these are nothing more than examples and do not limit the scope of the claims. The art described in the claims encompasses various and diverse modifications and alterations to the specific examples provided above as examples.

INDUSTRIAL APPLICABILITY

Figure 6:
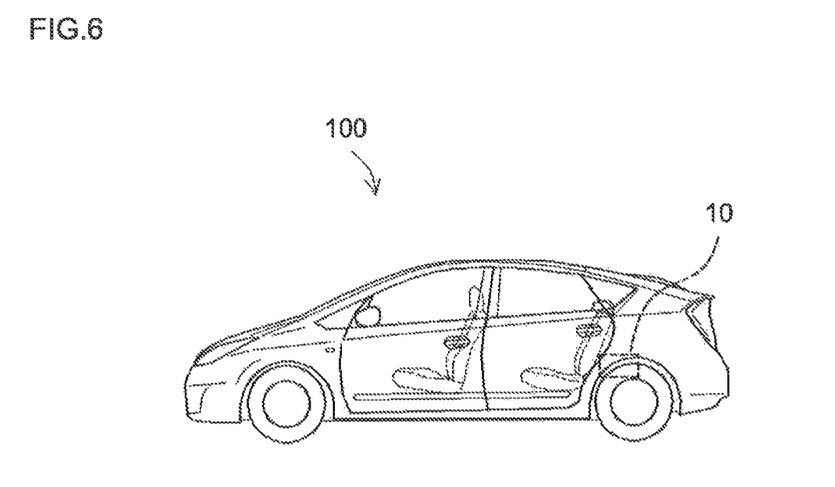
FIG. 6 is a side view that schematically shows a vehicle (automobile) that is provided with the secondary battery according to the present invention.

The secondary battery according to the present invention (for example, the lithium ion secondary battery 10) has an excellent safety and reliability as described in the preceding, and because of this can be advantageously used in particular as a power source for the motors (electric motors) mounted in vehicles, for example, automobiles, that are associated with high current outputs. Accordingly, the present invention provides, as schematically shown in FIG. 6, a vehicle (typically an automobile and particularly an automobile that is provided with an electric motor, such as a hybrid automobile, an electric automobile, and a fuel cell automobile) 100 that is provided with this lithium ion secondary battery 10 (typically a battery pack in which a plurality of these batteries 10 are serially connected) as a power source.

REFERENCE SIGNS LIST

10 Lithium ion secondary battery (secondary battery)
15 Battery case
20 Opening
25 Lid
30 Case main body
40 Safety valve
50 Wound electrode assembly
60 Positive electrode terminal
62 Positive electrode current collector
64 Positive electrode sheet (positive electrode)
66 Positive electrode active material layer
70 Separator sheet (separator)
72 Porous electroconductive layer (porous layer)
74 Electroconductive material
76A, 76B Electroconductive material-free porous layer
78A, 78B Pore
79 Electroconductive pathway
80 Negative electrode terminal
82 Negative electrode current collector
84 Negative electrode sheet (negative electrode)
90 Negative electrode active material layer
100 Vehicle (automobile)
170 Separator sheet (separator)
172 Porous electroconductive layer (porous layer)
174 Electroconductive material
176 Electroconductive material-free porous layer

The invention claimed is:

1. A secondary battery comprising:
a positive electrode;
a negative electrode; and
a porous separator interposed between the positive electrode and the negative electrode,
wherein the separator has a porous electroconductive layer in which an electroconductive material is dispersed, and two electroconductive material-free porous layers laminated on opposite sides of the porous electroconductive layer,
the melting point of a polymer constituting the porous electroconductive layer is lower than the melting point of a polymer constituting both of the two electroconductive material-free porous layers,
an average particle diameter of the electroconductive material present in the porous electroconductive layer is not larger than an average pore diameter of both of the two electroconductive material-free porous layers, and
the average pore diameter of both of the two electroconductive material-free porous layers is not larger than an average pore diameter of the porous electroconductive layer, and
wherein the porous electroconductive layer and the two electroconductive material-free porous layers are configured such that a plurality of electroconductive pathways are formed, connecting the positive electrode to the negative electrode, when an internal temperature of the secondary battery increases due to overcharging.

2. The secondary battery according to claim 1, wherein the polymer constituting the porous electroconductive layer is polyethylene and the polymer constituting both of the two electroconductive material-free porous layers is polypropylene.

3. The secondary battery according to claim 1, wherein thr electroconductive material is a carbon material.

4. The secondary battery according to claim 1, wherein the average pore diameter of the porous electroconductive layer is 0.1 μm to 1 μm, the average pore diameter of both of the two electroconductive material-free porous layer is 0.05 μm to 0.5 μm, and the average particle diameter of the electroconductive material present in the porous electroconductive layer is 0.01 μm to 0.1 μm.

5. The secondary battery according to claim 1, wherein the positive electrode contains a lithium transition metal complex oxide as a positive electrode active material, the negative electrode contains a negative electrode active material, and the secondary battery comprises an electrolyte solution that contains a lithium salt.

6. The secondary battery according to claim 1, wherein, when the porous electroconductive layer is made 100 mass %, the percentage content of the electroconductive material present in the porous electroconductive layer is greater than 3 mass % and less than 50 mass %.

7. The secondary battery according to claim 6, wherein the percentage content of the electroconductive material is from at least 8 mass % to not more than 40 mass %.

* * * * *